United States Patent [19]

Tovim

[11] 4,346,762
[45] Aug. 31, 1982

[54] PLASTICS MATERIAL HORSESHOES

[76] Inventor: Igal Tovim, Millers Farm, Norwood End, Fyfield, Ongar, Essex, England

[21] Appl. No.: 165,085

[22] Filed: Jul. 1, 1980

Related U.S. Application Data

[63] Continuation-in-part of Ser. No. 40,412, May 18, 1979, Pat. No. 4,265,314, which is a continuation of Ser. No. 777,506, Mar. 14, 1977, abandoned.

[30] Foreign Application Priority Data

Mar. 16, 1976 [GB] United Kingdom ............... 10428/76
Jul. 2, 1979 [SE] Sweden ................................. 7905778

[51] Int. Cl.³ ........................... A01L 5/00; A01L 3/00
[52] U.S. Cl. ......................................... 168/4; 168/17; 168/24; 168/DIG. 1
[58] Field of Search ................... 168/4, 11, 12, 17, 19, 168/20, 24, DIG. 1

[56] References Cited

U.S. PATENT DOCUMENTS

| | | | |
|---|---|---|---|
| 219,944 | 9/1879 | Hoffmann | 168/DIG. 1 |
| 226,422 | 4/1880 | Rouchel | 168/19 |
| 586,558 | 7/1897 | Lowes | 168/4 |
| 1,116,326 | 11/1914 | Powlowski et al. | 168/20 |
| 1,169,020 | 1/1916 | Eaves | 168/19 |
| 1,468,196 | 9/1923 | Curzon | 168/11 |
| 2,353,568 | 7/1944 | King | 168/13 |
| 3,302,723 | 2/1967 | Renkenberger et al. | 168/24 X |
| 3,490,536 | 1/1970 | Hourlier | 168/4 |
| 3,599,720 | 8/1971 | Mathern | 168/12 X |
| 3,921,721 | 11/1975 | George | 168/4 |

FOREIGN PATENT DOCUMENTS

21171 8/1930 Australia ............................. 168/12

Primary Examiner—Gene Mancene
Assistant Examiner—Robert P. Swiatek
Attorney, Agent, or Firm—Alexis Barron; Richard D. Weber

[57] ABSTRACT

A two part plastics material horseshoe has a relatively flexible plastics strip part of generally L-shaped cross-section, shaped so as to be suitable for adhering to the side wall of a hoof, and a relatively inflexible plastics shoe-part adapted for bonding to the strip-part once the latter has been adhered to the hoof. The two parts are pre-united in the toe region, to set the relative disposition thereof prior to adhering the strip part to the hoof. Attachment of the strip-part to the hoof is enhanced by providing a liner having a rough texture within the strip-part, and the shoe-part may be affixed to the strip-part by a heat-welding technique.

19 Claims, 11 Drawing Figures

PLASTICS MATERIAL HORSESHOES

BACKGROUND TO THE INVENTION (a) Field of the Invention

This application is a continuation-in-part of my earlier application Ser. No. 40,412, filed May 18, 1979, and now U.S. Pat. No. 4,265,314 itself a continuation of my yet earlier application Ser. No. 777,506, which was filed on Mar. 14, 1977, and now abandoned.

Priority is claimed under the International Convention from my British Patent Application No. 10428/76, filed Mar. 16, 1976 now issued as British Pat. No. 1517113.

The present invention relates to horse shoes, and concerns improvements in the plastics material horseshoes, as well as improvements to the methods of attaching such plastics material shoes to a horse's hooves, having regard to those shoes described and claimed in my earlier cases recited above. By the term 'plastics material', as herein used in relation to horseshoes, is meant synthetic and natural polymers and monomers, such as rubber or cellulosic formulations as well as synthetic resins.

(b) Description of the Prior Art

The technique of shoeing horses' hooves with metal shoes has been practised for several hundred years, and despite advances in many technologies, there has been little change in the horse shoe art. The usual procedure is to trim the keratinous portion of the hoof to the required length, and then to forge an iron shoe to match the trimmed hoof. Once cool, the shoe is attached to the hoof by means of nails hammered through holes in the shoe into the hoof so that the nails project through the hoof wall, whereafter the projecting nails are then cut off and cleated over.

The process described above is obviously in general most satisfactory, for it has been practised for a very long time. It does however have disadvantages which can lead to lameness in a horse. For example, a nail can sometimes penetrate the sensitive part of a foot, or if a horse casts off a shoe, nails may remain projecting from the bottom of the hoof and if the horse places weight on these, acute problems can be caused. Furthermore, a horse with brittle horn material sometimes cannot be shod because the nails would split the horn, and similarly a horse with slow-growing horn material can also be difficult to shoe because old nail-holes lead to splits.

Recently, such as in U.S. Pat. No. 3,599,720 there have been proposals for plastics material horse shoes, which can be pre-formed in a factory and then attached to a hoof, either by nailing or by using an adhesive. The pre-forming of a shoe from plastics eliminates the skilled labour required for forging a metal shoe, and moreover a lighter shoe can lead to significant advantages, at least for horses used in competitive sport. However, the nailing of plastics shoes still suffers the same disadvantages as nailing mtal shoes, whereas the use of adhesives has proved to be unable to withstand the rigours of normal usage. Consequently, plastics shoes have not so far been commercially successful.

As a result of investigations into the reasons for the unsatisfactory bonding of a plastics material shoe to a hoof, I came to the conclusion that for a pre-formed plastics shoe to be sufficiently hard-wearing for normal use, it would then lack sufficient flexibility to allow it to be bonded satisfactorily to a hoof. This led to my invention of a two-part plastics material horse shoe as described in the specification of my British Pat. No. 1517113, as well as in my U.S. patent application Ser. No. 40,412, which shoe has a relatively flexible strip-part adapted for adhering to a hoof, and a relatively stiffer shoe-part adapted for subsequent adhering to the strip-part. Field trials of such shoes constructed in accordance with my earlier invention have been most promising. However, it has been found that those plastics shoes are not as easy to fit as had been hoped, and moreover at times the life of the shoe once fitted was less than could be expected from a conventional metal shoe. I have established that, at least in part, this is because during setting or curing of the adhesive, any relative movement between the parts (such as might occur if a horse moves) weakens the bond. Also the toe portion of the shoe is in general subjected to the greatest stresses and there is a tendency for the shoe part to peel away from the strip-part, starting at the toe portion thereof.

OBJECTS OF THE INVENTION

It is a prime object of this invention to provide an improved plastics material horseshoe which overcomes the disadvantages and problems of the prior art metal and plastics material horseshoes as well as improving upon my own prior proposals as set out for instance in my British Pat. No. 1517113. It is a further object to provide a method of attaching a plastics material horseshoe to a hoof which allows excellent retention of the shoe to the hoof whilst in no way damaging the hoof, consequently allowing the shoeing of horses which otherwise could not wear shoes.

One particular object of the invention is to provide a two part plastics material horseshoe, one strip-part being adapted for attachment by an adhesive to a hoof and the other shoe-part being adapted for bonding to the one part, in which the toe regions are pre-united to set the relative disposition thereof prior to attachment of the strip-part to the hoof.

A further object is to improve the adhesive bond between a hoof and the strip-part of a two-part shoe by providing sections of reduced wall thickness in the strip part thereby to increase the flexibility thereof and consequently better to allow the pre-moulded strip-part to deform to fit a particular hoof.

Yet another object is to provide a two-part plastics material horseshoe having a strip-part adapted to be adhered to the side wall of a hoof, in which there is provided a roughened surface on the inner face of the strip part thereby to achieve a better bond between the hoof and the strip part.

Another object of this invention is to provide a two part plastics material horseshoe having a relatively flexible strip part adapted to fit closely against a horse's hoof and a relatively inflexible shoe-part adapted to be bonded to the strip-part, in which the shoe-part and strip-part are essentially made of similar grades of plastics material and the relative inflexibility of the shoe-part is imparted thereto by an insert substantially wholly embedded in the plastics material of the shoe-part which insert is relatively hard and inflexible.

A further object of this invention is to provide a shoe-part of a two part plastics material horseshoe also having a strip-part adapted to fit against and be bonded by an adhesive to a hoof, which shoe-part has an electric heating element embedded therein to allow the heat bonding of the shoe-part to the strip-part once adhered to the hoof, by supplying electric current to the element.

Another object of this invention is to provide a method of attaching a two-part plastics material horseshoe to a horse's hoof, which horseshoe has a strip-part adapted for fitting against a hoof and a shoe-part adapted for bonding to the strip-part, in which method the strip-part is bonded to the hoof by means of an adhesive and the shoe part is bonded to the strip-part by heat welding.

SUMMARY OF THE INVENTION

According to one aspect of this invention, there is provided apparatus for shoeing a horse, comprising a strip-part of plastics material having a generally L-shaped cross-section and being preformed to fit against both the wall and peripheral region of the sole of a horse's hoof around the front and sides thereof, said preformed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and a preformed plastics material shoe-part, said shoe-part also being formed of a plastics material and being relatively inflexible as compared with the strip-part, said plastics shoe-part being preformed for bonding to said preformed strip-part after said strip has been adhesively bonded to a horse's hoof, said strip-part and said shoe-part being pre-united in the toe regions thereof prior to the adhesive application of said strip-part to the hoof thereby to pre-set the relative disposition of said strip-part and shoe-part for the bonding of said shoe-part to said strip-part.

According to another aspect, this invention provides a method of attaching described plastics material shoe apparatus of this invention to a horse's hoof, which method comprises the steps of selecting a pre-united and pre-formed strip-part and shoe-part combination appropriate for the hoof to be shod, adhering the preformed strip-part to the side wall of the hoof around the front and sides thereof, and then bonding to the strip-part the opposed regions of the shoe-part not already pre-united to the strip-part.

BRIEF DESCRIPTION OF THE DRAWINGS

In order that this invention may better be understood, it will now be described in greater detail and certain specific embodiments thereof will be described, referring to the drawings. In the drawings.

DESCRIPTION OF THE PREFERRED EMBODIMENTS

The two-part plastics material horseshoe apparatus of this invention is used by adhering to the horse's hoof that portion of the strip-part which overlies the side wall of the hoof, and by providing a relatively flexible strip-part, whatever deformation is necessary to fit a particular hoof can with ease be accommodated, allowing an intimate bond to be formed by adhesive between the strip-part and the hoof. The flexibility also allows a wide range of sizes and shapes of hooves to be satisfactorily fitted, using only few distinct shapes and sizes of pre-formed strip-parts. Despite such deformation, the sole portion of the strip-part may remain substantially flat, and the relatively inflexible shoe-part (as compared to the strip-part) can be joined to the strip-part with a bond of high strength, either with an adhesive selected having regard to the materials of the shoe and strip, or by a chemical or heat welding technique if the materials are compatible. Such a bond displays much greater strength than is the case if a one piece hard and relatively inflexible shoe is deformed locally to fit a particular hoof, and bonded directly thereto. These advantages are displayed by my previous invention and are maintained in the present invention, but by pre-uniting the toe regions of the shoe and strip-parts, resistance to separation in the toe region is greatly heightened, giving a much longer useful life, and moreover the shoe-part is pre-positioned and held against relative movement when being bonded to the strip-part, much facilitating the fitting of the shoe-part to the strip-part and allowing a better bond to be formed therebetween.

Figure 3:
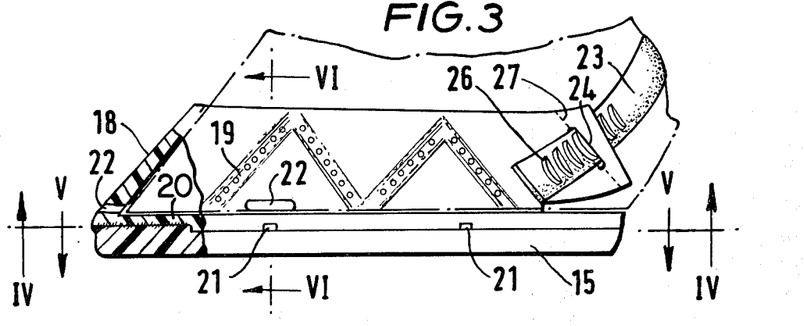
FIG. 3 is a part sectional side view of the shoe apparatus shown in FIG. 2.
Figures 4, 5:
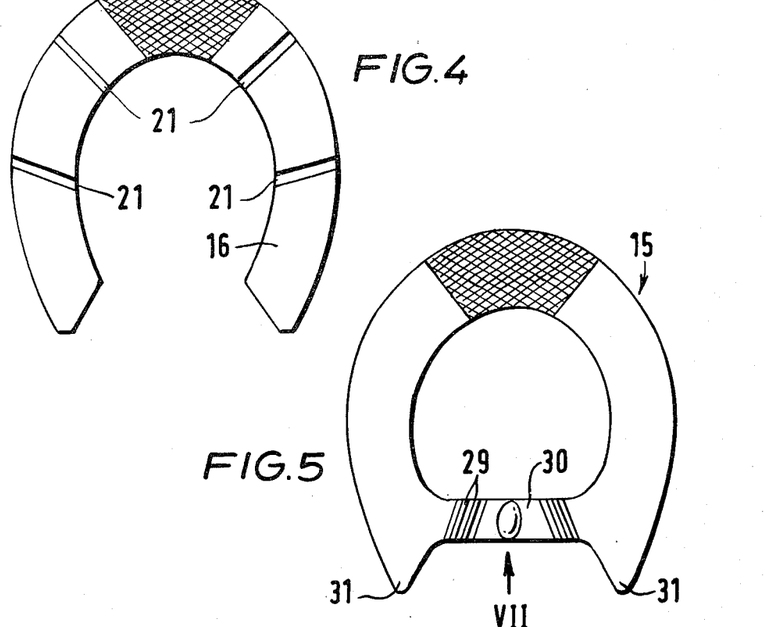
FIG. 4 is a sectional view taken on line IV—IV marked on FIG. 3, being the interface between the two shoe-parts before the bonding thereof.
FIG. 5 is a sectional view taken on line V—V marked on FIG. 3, being again the interface between the two shoe parts before the bonding thereof.

The pre-united toe-region should not extend so far along the strip-part as to inhibit the flexibility thereof, and practical tests have indicated that on a typical strip-part, the pre-united toe region should not extend for more than 75 mm and preferably about 50 mm of external peripheral length, and about 25 mm of length internally of the strip-part, as described in detail below referring to for instance FIGS. 3 to 5. To ensure sufficient flexibility despite being pre-united to the shoe-part, the sole portion of the strip-part preferably has a section of reduced wall thickness at or adjacent the two extremities of the pre-united toe region. Advantageously, each such section is in the form of a groove or channel extending transversely across the sole portion of the strip-part and facing the shoe-part, such as are shown at 21 in FIGS. 2 and 3. To enhance the flexibility of the strip-part yet more, at least two further such sections may be provided, spaced from the pre-united toe regions.

Figures 1, 2:
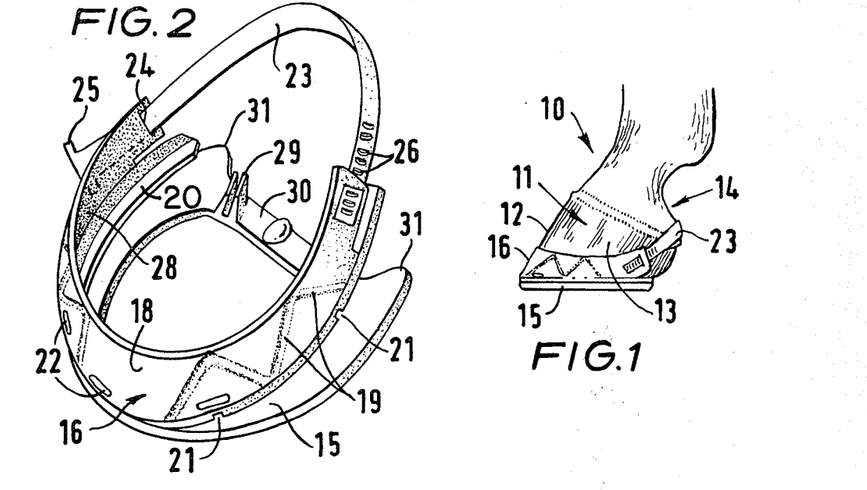
FIG. 1 is a general side view of a horse's hoof immediately after being fitted with a horse shoe apparatus of this invention.
FIG. 2 is a general perspective view of the shoe apparatus shown in FIG. 1.

The portion of the strip-part which overlies and is adhered to the side wall of the hoof should be made as flexible as possible consistent with the requirements of strength, and it is preferred for the wall thickness to be reduced at various points along the length of the strip-part. Advantageously, the external surface of said portion has grooves formed therein, each preferably of rounded section and the grooves being formed to define a zig-zag channel along the length of the strip, as is shown in FIG. 2, though the flexibility could be further enhanced by providing holes therein.

The attachment of the pre-formed strip-part to a hoof may be improved by ensuring the strip-part does not move during setting or curing of the adhesive. A strap may be provided for this purpose, which strap passes around the bulb of the heel of a hoof, the strap being releasably attachable to the strip-part. Preferably the strap is resilient so that by appropriate adjustment of the length thereof, the strap may be fitted over the bulb of the heel under tension. Once the adhesive bond is complete, then the strap may be removed.

Clearly, in view of the large stresses imparted to a horse shoe when in use, the adhesive employed for adhering the strip-part to the horse's hoof must carefully be selected so as to offer very high shear and peel strengths. Also, the adhesive should display good flexural and impact properties, and good gap-filling properties are desirable. Tests have shown that anaeorobic adhesives are useful, such as cyano-acrylate adhesives, or acrylic adhesives with an amine initiator and possibly with an accelerator.

To give the adhesive a better surface to which to bond, it is preferred for at least the inner surface of that portion of the strip-part which overlies the side wall of a hoof to have a rough texture; one manner of achieving this is for the surface to be lined with a textile material which can for instance be formed integrally with the inner surface of the strip-part during a moulding step therefor. Such a textile material may be an open-weave cotton fabric, or a similar fabric made from synthetic yarns. Another possibility is for the inner surface of the strip-part to carry a foamed or 'blown' plastics material, such as an open-cell foamed polyurethane liner. Such a liner may be stretched over the core of a mould used in the production of the strip-part, prior to the injection of the plastics material which forms the strip-part, such that the liner will bond intimately with the strip-part, and the strip-part will still have a flat inner surface on each of its two faces, as shown particularly in FIG. 6.

Preferred material for the strip-part is a polyurethane elastomer, advantageously of Shore 'A' hardness of from 83 to 87, through other plastics materials and other resiliencies (or hardnesses) and hence flexibilities, could be used, provided the strip-part is relatively flexible as compared to the shoe-part. The shoe-part must be relatively inflexible but also capable of being bonded sufficiently firmly to the strip-part. The preferred plastics material is again a polyurethane elastomer, but with a Shore 'A' hardness of from 90 to 95, though other materials could be used. In one preferred embodiment the shoe-part is made primarily of the same grade of polyurethane elastomer as the strip-part, but sufficient inflexibility is imparted to the shoe-part by means of a relatively hard insert embedded within the plastics material of the shoe-part. Such an insert may again be of a polyurethane elastomer, but of a much harder grade than the remainder of the shoe-part, to achieve sufficient differential flexibility.

The two parts of the overall horse shoe apparatus may be made separately and then united together in the toe regions, for instance by chemical welding or adhesive bonding but preferably by heat welding or fusion. An alternative would be to make the two parts in a suitable moulding machine such that the two parts are fused together in the toe regions ab initio—for example by having two moulding cavities with an aperture therebetween in the toe region of the moulded shoe apparatus, whereby injected plastics materials may fuse together during the moulding steps. The design, construction and use of suitable apparatus for this purpose is within the competence of a skilled plastics technologist and will not therefore be described in detail here.

Tests have shown that it is not possible satisfactorily to bond the sole portion of the strip-part to the hoof, and consequently the strip-part is in use bonded primarily only to the side wall of the hoof. The result is that water, dirt and mud may collect between the sole of the hoof and the strip-part and the hydraulic pumping action there produced when the horse walks can force the strip-part to peel away from the side wall of the hoof. It is greatly preferred to provide apertures such as those shown at 22 in FIGS. 2 and 3, each extending through the strip-part in the region of the junction between the two wall portions thereof, through which apertures any liquid or semi-liquid may drain when the horse walks, thereby relieving hydraulic pressure which otherwise would be generated. Such apertures also allow any excess adhesive to drain during adhering of the strip-part to the hoof.

Figure 10:
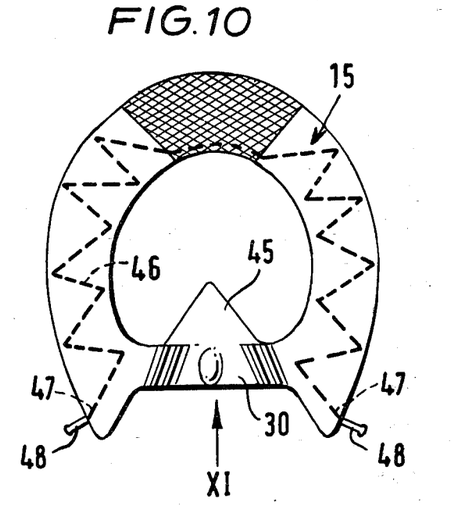
FIG. 10 is a plan view of a third embodiment of shoe-part.

One preferred manner of joining the shoe-part to the strip-part is by means of a heat-welding technique, and this can conveniently be achieved by inserting a heated blade between the opposed sole portions of the two parts, urging the two parts together and then sliding the blade away once the two parts have reached a sufficiently high temperature. An alternative is shown in FIG. 10, in which there is embedded an electric heating element or filament in the plastics material of preferably the shoe-part but possibly instead the strip-part, whereby the two parts may be fused together on being urged together and electric current supplied to the heating element. Instead of such heat-fusion techniques, checmical bonding or adhesive agents may be employed, appropriately selected for the plastics materials of the two parts.

To locate the rear of the shoe-part and to resist sideways movement thereof, it is preferred for there to be a bar extending between the tips of the shoe-part which bar is provided with a pair of upstanding pegs locatable one in each gap of a hoof, to both sides of the frog. By making the bar substantially rigid, the two tips of the shoe-part are tied together and only should both tips peel from the strip-part can the shoe be thrown. Also, the pegs engaged in the V-shaped recesses (or gaps) of the hoof to each side of the frog restrain sideways movement of the bar, and thus of the shoe tips. The pegs preferably are tapered, so as to correspond generally in shape to the gaps.

Figure 11:
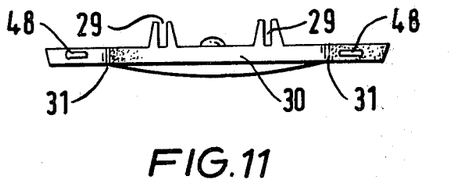
FIG. 11 is an end view taken on arrow XI marked on FIG. 10.

Further location may be provided by a forwardly-pointing tapering projection from the bar, which projection locates in the frog of a horse's hoof when the shoe apparatus is fitted thereto. Such a projection should conform generally to the shape of the frog and preferably is therefore essentially of triangular shape. If required, in order to ensure that the projection bears on the frog as the horse walks, the material of the shoe-part may be thickened in the region of the projection. This particular arrangement is shown in FIGS. 10 and 11.

The preferred embodiments mentioned briefly above, will now be described in greater detail. Referring initially to FIG. 1, there is shown in outline a horse's foot 10 including a keratinous material shell constituting the hoof 11, which hoof has, in the region of the toe, a front wall 12 which merges with a side wall 13 extending round to the heel 14. Between the side walls 11 at the heel is the frog (not shown), and the peripheral region of the sole is known as the horn. The nails are driven into the horn when fastening conventional metal shoes to the hoof so that the nails project out of the front and side walls of the hoof, to be trimmed and then cleated over.

FIGS. 1 to 6 show a plastics material shoe apparatus of this invention which incorporates many of the preferred features mentioned above and comprising a shoe-part 15 attached indirectly to the hoof 11 by the use of a pre-formed, generally L-shaped strip-part 16 adhered to the front and side walls of the hoof. The strip-part 16 is pre-formed to have the general shape of a horse's hoof, and is made of a relatively flexible and resilient material so that it may be deformed locally as necessary to fit closely to a particular hoof. The shoe-part 15 is, compared to the strip-part 16, relatively inflexible and is permanently attached to the strip-part 16 in the toe region by a heat-welding technique, prior to the shoe apparatus being fitted to a horse. As can be seen from FIG. 3, the toe region of the shoe-part is thickened, and the strip-part correspondingly thinned, to allow greater wear to take place before the need to change the shoe-apparatus. Also, it is found that due to the action of a horse, the strip-part should be slightly proud of the shoe-part, as shown.

The selection of the materials for the strip-part 16 and the shoe-part 15 is important in order to obtain the required performance. The shoe-part 15 must be inflexible and preferably also hard and resistant to abrasion, but must also be amenable to attachment to the strip-part 16. The strip-part 16 must be flexible so as to allow it to be fitted closely to the hoof 11, and must be suitable for attachment by glueing to the keratinous material of the hoof. The strip-part 16 should also display at least slightly resilient properties, so as to allow a measure of shock absorption. This reduces the impact forces transferred to a horse's hoof when travelling on hard roads, and also helps to reduce the shear and peeling forces imparted to the glue used to hold the strip-part 16 to the hoof.

Taking the above into account, it has been established that different grades of polyurethane elastomer are suitable for both parts of the apparatus. Using such a material, a Shore 'A' hardness of substantially 93 has been found appropriate for the shoe-part and a Shore 'A' hardness of substantially 85 for the strip-part.

To keep the strip-part 16 as flexible as possible, the external surface of the flange 18 which overlies the side wall of the hoof has formed therein a plurality of groove 19, together defining a zig-zag pattern. Holes may also be provided in the flange 18 of the strip-part, as shown, further to increase the flexibility thereof. Moreover, the wall thickness of the flange 18 tapers towards its free upper end, and the other flange 20 which extends under the sole of the hoof has four channels 21 formed therein, to assist close fitting of the sole part to the peripheral shape of the hoof side walls. These features permit any one pre-formed strip-part to fit many different shapes and sizes of hoof, whilst still allowing the flange 18 to maintain a close and intimate contact with the walls of the hoof.

As can be seen from FIGS. 1 to 6, there are provided three apertures 22 through the flange 18, which apertures are immediately adjacent the other flange 20 of the strip-part. These apertures 22 serve a dual purpose; any liquid or semi-liquid material such as mud which may get between the sole and the other flange 20 can be drained therethrough by the pumping action generated on the horse placing weight on the hoof; and excess glue deposited on the flange 18 during glueing thereof to the hoof may be relieved, thus allowing a better bond to be obtained by keeping the glue thickness to a minimum.

Many types of adhesive could be used, but the required properties include high shear, peel, flexural and impact strength, and preferably a good gap-filling property. Furthermore, because weight must be kept off the hoof whilst the adhesive is setting, it is important that the adhesive sets rapidly. In the case in which the shoe is adhered to the strip, the adhesive must be compatible with the materials selected for the shoe and the strip, as well as with the keratinous material of the hoof. Preferred types of adhesive include anaerobic glues such as the cyanoacrylate family, and acrylic glues with an amine initiator and possibly an accelerator to ensure rapid setting.

To assist the retention of the strip-part 16 to the hoof 11 during setting or curing of the adhesive therebetween, a strap 23 can temporarily be attached to the rear portions of the strip-part. To this end, the strip-part has a slot 24 at each rear portion, through which the ends of the strap 23 may be passed, forwardly and outwardly of the strip-part. One end of the strap 23 has two lugs 25, to prevent that end being pulled through a slot 24, whereas the other end portion has a plurality of upstanding teeth 26 which may easily be advanced through a slot 24, but resist withdrawal therefrom. Conveniently, the strap 23 is made of a similar material to that of the strip-part, and preferably is at least slightly elastic, so that after the length has been adjusted by pulling the toothed end portion through a slot 24, the strap may then be sprung over the bulb of the heel as shown in FIG. 1. After the adhesive has set, the strap may be removed by cutting off the rear part of the strip. To assist this, perforations 27 are provided in flange 18 of the strip-part.

Figure 6:
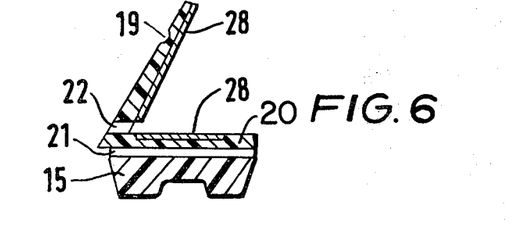
FIG. 6 is a sectional view taken on line VI—VI marked on FIG. 3.

Further to assist the adhesion of the strip-part to the hoof 11, the inner surface of the flange 18 is preferably roughened or otherwise made more receptive to the adhesive being used. As shown in FIG. 6, a foamed plastics material liner 28 may be bonded to the flange 18, which liner is for instance of the same type of material as the strip-part itself, to ensure a good bond therewith. The open-cell structure of the liner 28 provides a rough surface relative to the smooth moulded finish of the strip-part, and thus allows the adhesive to key thereto, to enhance the resistance to failure of the adhesive bond. Such a liner may be a foamed or blown polyurethane elastomer roller to a sheet thickness of about 1 mm, which is then stretched over the mould employed to form the strip-part before moulding thereof, whereby an intimate bond to the flange 18 is obtained on moulding of the strip-part.

Once the strip-part has been adhered to the hoof, the shoe-part is bonded to the strip-part, for instance by a heat-welding technique. This may be achieved by positioning a hot blade or a blade having an electric heating element therein between and engaged with the opposed regions of the strip and shoe-parts to be bonded, and when the plastics material has reached an appropriate temperature, the blade is removed and the shoe and strip urged together to effect a bond therebetween. Another possibility is for an electric heating filament to be imbedded in the shoe-part and for current to be supplied thereto when the horse has placed weight on the hoof having the strip-part already adhered thereto.

Location of the rear of the shoe-part is effected by a pair of pegs 29 upstanding from a bar 30 extending between the rear tips 31 of the shoe-part, the pegs fitting within the gaps present in a horse's hoof to each side of the frog. The bar 30 serves firmly to tie the two tips 31 together and sideways movement of the tips is prevented by the engagement of the pegs 29 with said gaps. The pegs may be bifurcated, as shown. to allow them to deform to fit closely within the gaps.

The front and back hooves of horses are in general of two distinct shapes, and of course there is a considerable variation in size of either shape. It is envisaged therefore that the shoe and strip-parts will be made in two distinct styles—one for front hooves and one for back hooves. Each style will be made in several sizes, to enable an appropriate shoe apparatus to be selected for any particular hoof of a very wide range of horses. The strip can be deformed locally, as described above, in order to fit closely against the wall and peripheral region of a hoof, and though the shoe-part cannot easily be deformed—on account of its lack of flexibility—it can nevertheless be trimmed before or after being bonded to the strip. By providing a relatively resilient strip-part, strain thereon, when fitting it to the hoof, is avoided and a good foundation for a relatively hard shoe-part is provided.

To change a shoe fitted in accordance with the invention, the old shoe is removed with a sharp knife or by using the usual tools for trimming the keratinous material of a hoof. After cutting back the wall of the hoof in the usual way because of the growth thereof, any remaining portion of the strip-part adhered to the hoof side wall can be removed with a rasp. This also has the effect of helping to clean the side wall to allow good adhesion thereto but chemical cleaners may be used as well. Next, the selected strip and shoe combination has a coating of adhesive applied to the inwardly-directed faces of the flange 18 of the strip-part, and the strip-part is pressed on to the front and side of the hoof wall, as well as to the peripheral region of the sole. The length of strap 23 is adjusted by appropriate positioning of the pins 26, and then the strap 23 is sprung over the bulb of the heel, as shown in FIG. 1. Next, a blade (not shown) having an electrical heating element is inserted between the overlying area of the shoe-part and strip-part to one side of the welded toe region 16, current is supplied to the blade and the two parts pressed together. The blade is pulled out when the plastics material is sufficiently hot to unite, and the procedure repeated for the other side of the united toe-area. Excess adhesive relieved through apertures 22 is wiped away, and one the adhesive has set, the strap 23 and rear ends of the strip-part 16 are cut away.

Figures 7, 8, 9:
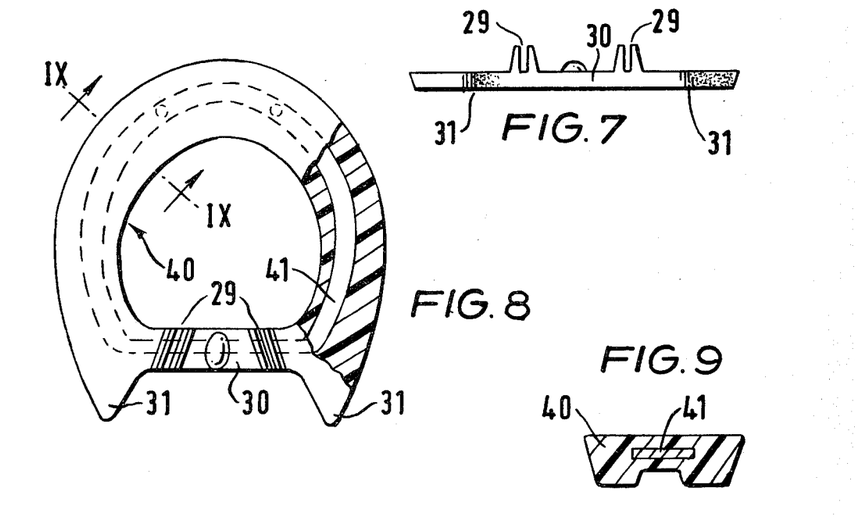
FIG. 7 is an end view taken on arrow VII marked on FIG. 5.
FIG. 8 is a plan view, partly in section, of a second embodiment of shoe-part.
FIG. 9 is a sectional view taken on line IX—IX marked on FIG. 8.

FIGS. 8 and 9 show an alternative shoe part, which is moulded from a similar grade of material as the strip-part. However, this shoe-part 40 is still maintained relatively inflexible as compared with the strip-part 16 by virtue of a relatively hard insert 41 embedded in the shoe-part. Such an insert 41 may be made of the same type of material as the shoe and strip-parts, but having for instance a Shore 'A' hardness of at least 100. The insert may instead be made of some other material, such as a polycarbonate, and then to ensure a good mechanical connection between the insert and the moulded shoe-part, lugs may upstand from the insert around which the material of the shoe-part will be moulded.

FIGS. 10 and 11 show a further embodiment of shoe-part, in which there is provided a forwardly-directed triangular projection 45 from the bar 30. This projection may locate in the frog of the horse's hoof and thus better position the shoe. The thickness of the shoe is increased in the region of the projection 45, as can be seen in FIG. 11, whereby when a horse stands on a hoof shod with this shoe-part, some weight is transferred to the frog, rather than all the weight being carried by the edge portion of the shoe-part. This relieves some of the stresses from the adhesive bond between the strip-part and the hoof.

Also shown in FIG. 10 is a continuous electric heating filament 46 which is embedded in a zig-zag fashion in the plastics material of the shoe-part, to each side of the pre-united toe region. The two zig-zag parts are connected together under the pre-united toe region, and the two ends 47 of the filament are electrically joined respectively to two pins 48 projecting from the shoe-part adjacent the rear tips 31 thereof. To use this embodiment, once the strip-part has been adhered to a hoof, the horse places weight on the combined shoe apparatus, thus pressing the shoe-part against the strip-part, in its pre-set disposition afforded by the pre-united toe-region. Then, electricity is fed to the pins 48 from for instance an automobile battery with a couple of leads having electrical connectors on the ends thereof, until the temperature of the plastics material has been raised sufficiently to fuse the shoe-part to the strip-part. The electricity supply is removed, and rapidly the two parts cool to provide a permanent bond therebetween. Finally, the pins 48 may be cut or broken off.

I claim:

1. Apparatus for shoeing a horse, comprising a strip-part of plastics material having a generally L-shaped cross-section and being pre-formed to fit against both the wall and peripheral region of the sole of a horse's hoof around the front and sides thereof, said pre-formed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and a pre-formed plastics material shoe-part, said shoe-part also being formed of a plastics material and being relatively inflexible as compared with the strip-part, said plastics shoe-part being pre-formed for bonding to said pre-formed strip-part after said strip has been adhesively bonded to a horse's hoof, said strip-part and said shoe-part being pre-united in the toe regions thereof prior to the adhesive application of said strip-part to the hoof thereby to pre-set the relative disposition of said strip-part and shoe-part for the bonding of said shoe-part to said strip-part.

2. Apparatus as claimed in claim 1, wherein said pre-united toe region extends for not more than 75 mm of external peripheral length of said shoe and strip-parts.

3. Apparatus as claimed in claim 2, wherein the pre-united toe region extends for not more than 25 mm of internal peripheral length of said shoe and strip-parts.

4. Apparatus as claimed in claim 1, wherein there is a section of reduced wall thickness in the sole portion of said strip-part at or adjacent the two extremities of the pre-united toe region.

5. Apparatus as claimed in claim 4, wherein each said section of reduced wall thickness is in the form of a channel extending transversely across the sole portion of said strip-part each of which channels opens towards said shoe-part.

6. Apparatus for shoeing a horse, comprising a strip-part of plastics material having a generally L-shaped cross-section and being pre-formed to fit against both the wall and peripheral region of the sole of a horse's hoof around the front and sides thereof, said pre-formed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and a pre-formed plastics material shoe-part, said shoe-part also being formed of plastics material and being relatively inflexible as compared with said strip-part, said plastics shoe-part being pre-formed for bonding to said pre-formed strip-part after said strip has been adhesively bonded to a horse's hoof, the wall thickness of the portion of said strip-part which overlies the side wall of the hoof being reduced at several locations along the length of said strip-part.

7. Apparatus as claimed in claim 6, wherein the external surface of said portion has grooves formed therein, which grooves define a zig-zag channel along the length of the strip-part.

8. Apparatus as claimed in claim 1 or in claim 6, wherein there is provided a strap which is adapted to pass around the bulb of the heel of a hoof, said strap being adjustably attachable to said strip-part.

9. Apparatus as claimed in claim 8, wherein the strap is formed of a resilient material so that by appropriate adjustment of the length thereof, said strap may be fitted over said bulb of a horse hoof heel, under tension.

10. Apparatus for shoeing a horse, comprising a strip-part of plastics material having a generally L-shaped cross-section and being pre-formed to fit against both the wall and peripheral region of the sole of a horse's hoof around the front and sides thereof, said pre-formed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and a pre-formed plastics material shoe-part, said shoe-part also being formed of plastics material and being relatively inflexible as compared with said strip-part, said plastics shoe-part being pre-formed for bonding to said pre-formed strip-part after said strip has been adhesively bonded to a horse's hoof, at least the inner surface of that portion of said strip-part which is adhesively adapted to the side wall of the hoof having a rough texture.

11. Apparatus as claimed in claim 10, wherein the rough texture is provided by a foamed plastics material carried on the inner surface of the strip-part.

12. Apparatus for shoeing a horse, comprising a strip-part of plastics material having a generally L-shaped cross-section and being pre-formed to fit against both the wall and peripheral region of the sole of a horse's hoof around the front and sides thereof, said pre-formed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and a pre-formed plastics material shoe-part, said shoe-part also being formed of plastics material and being relatively inflexible as compared with said strip-part, said plastics shoe-part being pre-formed for bonding to said pre-formed strip-part after said strip has been adhesively bonded to a horse's hoof, said shoe-part being made essentially of the same grade of plastics material as said strip-part, and sufficient inflexibility being imparted to said shoe-part by means of a relatively hard insert embedded within the plastics material of said shoe-part.

13. Apparatus for shoeing a horse, comprising a strip-part of plastics material having a generally L-shaped cross-section and being pre-formed to fit against both the wall and peripheral region of the sole of a horse's hoof around the front and sides thereof, said pre-formed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and a pre-formed plastics material shoe-part, said shoe-part also being formed of plastics material and being relatively inflexible as compared with said strip-part, said plastics shoe-part being pre-formed for bonding to said pre-formed strip-part after said strip has been adhesively bonded to a horse's hoof, apertures being provided through said strip-part in the region of the junction between the two wall portions forming the L-shaped cross-section thereof, through which apertures fluids may drain when the apparatus is fitted to a horse.

14. Apparatus for shoeing a horse, comprising a strip-part of plastics material having a generally L-shaped cross-section and being pre-formed to fit against both the wall and peripheral region of the sole of a horse's hoof around the front and sides thereof, said pre-formed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and a pre-formed plastics material shoe-part, said shoe-part also being formed of plastics material and being relatively inflexible as compared with said strip-part, said plastics shoe-part being pre-formed for bonding to said pre-formed strip-part after said strip has been adhesively bonded to a horse's hoof, there being embedded in the plastics material of one of said shoe-part and said strip-part an electric heating element, whereby said two parts may be fused together on being urged together and electric current supplied to the heating element.

15. Apparatus for shoeing a horse, comprising a strip-part of plastics material having a generally L-shaped cross-section and being pre-formed to fit against both the wall and peripheral region of the sole of a horse's hoof around the front and sides thereof, said pre-formed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and pre-formed plastics material shoe-part, said shoe-part also being formed of plastics material and being relatively inflexible as compared with said strip-part, said plastics shoe-part being pre-formed for bonding said pre-formed strip-part after said strip has been adhesively bonded to a horse's hoof, there being a bar extending between the tips of said shoe-part which bar is provided with a pair of upstanding pegs locatable one in each gap of a hoof, to both sides of the frog thereof, and said bar further carrying a forwardly-directed tapering projection adapted to be located in the frog of a hoof when the shoe apparatus is fitted thereto.

16. Apparatus for shoeing a horse, comprising a strip-part of plastics material having a generally L-shaped cross-section and being pre-formed to fit against both the wall and peripheral region of the sole of a horse's hoof around the front and sides thereof, said pre-formed strip-part being adapted for adhesive application to a horse's hoof and having sufficient flexibility readily to conform closely to the configuration of the front and side walls of the hoof thereby to maximize the adhesively bonded surface contact of the strip-part with the wall of the hoof, and a pre-formed plastics material shoe-part, said shoe-part also being formed of plastics material and being relatively inflexible as compared with said strip-part, said plastics shoe-part being pre-formed for bonding to said pre-formed strip-part after said strip has been adhesively bonded to a horse's hoof, the toe regions of said strip-part and said shoe-part being united to pre-set the relative disposition of said shoe-part with respect to said strip-part prior to said strip-part being adhesively applied to a hoof, the sole portion of said strip-part having a section of reduced wall thickness at or adjacent the extremities of said pre-united toe region as well as the wall thickness of the portion of said strip-part which overlies the side wall of the hoof being reduced at a plurality of locations along the length of said strip-part thereby jointly increasing the flexibility of said strip-part, and the inner surface of said portion of said strip-part being provided with a roughened texture by means of a foamed plastics material liner carried on the inner surface of said strip-part thereby to assist the adhesive application of said strip-part to a hoof.

17. Apparatus as claimed in claim 16, wherein said strip-part is made of a polyurethane elastomer having a Shore 'A' hardness in the range of from 83 to 87 and said shoe-part is made of a polyurethane elastomer having a Shore 'A' hardness in the range of from 90 to 95.

18. Apparatus as claimed in claim 16, wherein said shoe-part is made essentially of the same grade of plastics material as said strip-part, sufficient inflexibility being imparted to said shoe-part by means of a relatively hard insert embedded within the plastics material of said shoe-part, said insert being made of a relatively hard grade of the same plastics material used for making the shoe-part.

19. A method of attaching plastics material horse shoe apparatus having a strip-part of plastics material having a generally L-shaped cross-section and being pre-formed to fit against both the wall and peripheral region of the sole of a horse's hoof around the front and sides thereof, said strip-part having sufficient flexibility readily to conform closely to the configuration of the front and side walls of the hoof, and a pre-formed plastics material shoe-part, said shoe-part also being formed of plastics material and being relatively inflexible as compared with said strip-part, said shoe-part being united to said strip-part at the toe regions thereof prior to attachment of the shoe apparatus to a hoof, which method comprises the steps of selecting a pre-united and pre-formed strip-part and shoe-part combination appropriate for the hoof to be shod, adhering said pre-formed strip-part to the side wall of the hoof around the front and sides thereof, and then bonding to said strip-part by means of a heat-welding process the opposed regions of said shoe-part and strip-part not already pre-united to the strip-part.

* * * * *